June 28, 1949.  W. DZUS  2,474,799
FASTENER
Filed Aug. 29, 1944
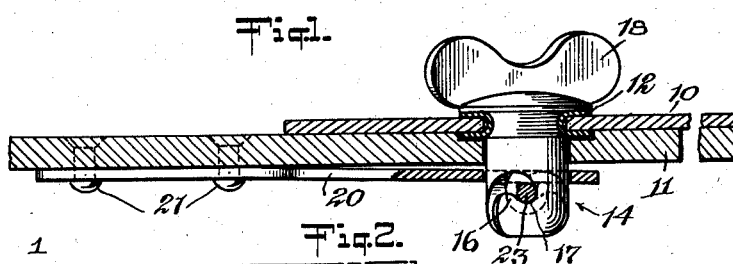
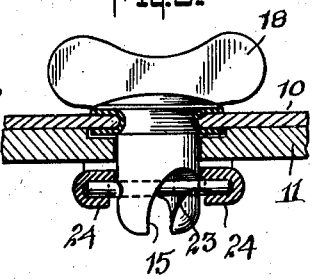
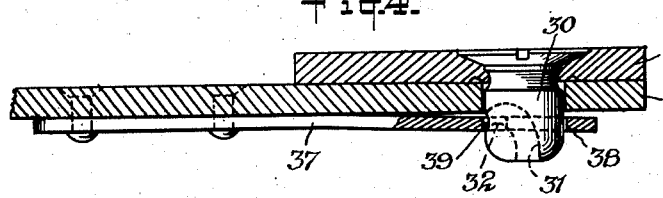
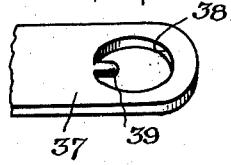
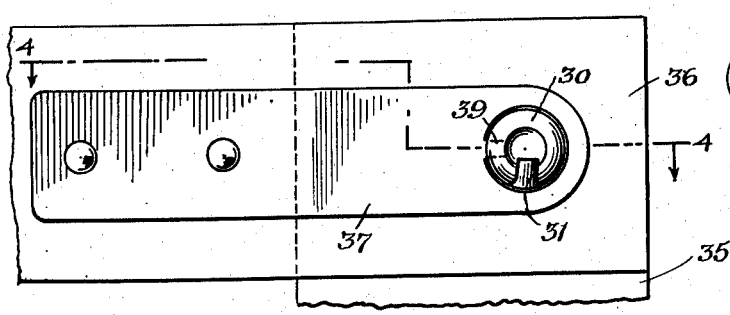
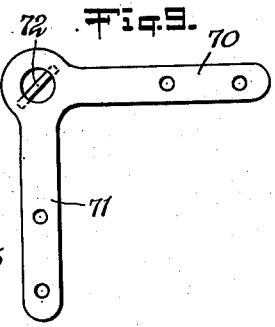
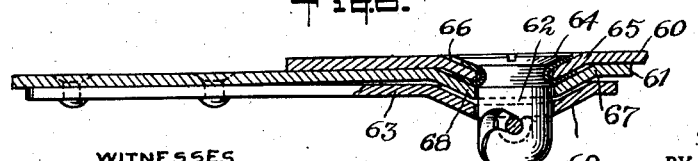
INVENTOR.
William Dzus
WITNESSES
BY
ATTORNEYS Patented June 28, 1949

2,474,799

UNITED STATES PATENT OFFICE 2,474,799

FASTENER

William Dzus, West Islip, N. Y.

Application August 29, 1944, Serial No. 551,660

1 Claim. (Cl. 24—221)

This invention relates to fasteners and, more particularly, to fasteners adapted to hold two parts together. My device is particularly adapted to hold two flat objects together in close proximity under tension so that there will be no separation of the elements when the parts are placed under stress.

A further object is to provide a fastener of the spiral slot type in which the spring element may be fastened to the part bearing it at some distance from the place of contact.

A further object is to provide a fastener having a leaf spring which will be so constructed as to allow the head to be flush with the plate in which it is mounted.

Further objects and advantages of my device will be apparent from the accompanying description and drawings, in which—

Figure 1 is an elevation partly in section of a device embodying my invention, taken on the line 1—1 of Fig. 2;

Fig. 2 is a plan view of said device;

Fig. 3 is an end view in section of the fastener;

Fig. 4 is a view of another form of my device taken on the line 4—4 of Fig. 5;

Fig. 5 is a plan view of this modification;

Fig. 6 is a perspective view of a stud used in the form shown in Figs. 4 and 5;

Fig. 7 is a detailed view of the end of the spring;

Fig. 8 is a further form of my device adapted to be used with a flush head;

Fig. 9 illustrates a further development of my device.

Referring more particularly to the drawings, my device may be used to fasten two members such as the plates 10 and 11 together. Mounted in the plate 10 by means of the grommet 12 is a stud 14 which may be rotated within the grommet. Stud 14 is provided with a spiral slot 15, defining a shoulder 16 forming a detent 17. Mounted on the plate 11 is a leaf spring member 20 fastened by rivets 21 or spot welded to the plate as the case may be. Spring member 20 has an opening 22 at one end across which extends the cross bar 23 held in place by bent over portions 24 as shown in Figs. 2 and 3. The slot 15 in the stud 14 engages the cross bar 23 and moves it upwardly into the detent 17 upon rotation of the stud by means of wing 18 or, where no wing is provided, by inserting a tool into a kerf as shown in Fig. 8. When locked the amount of travel between the plates 10 and 11 is definitely limited by the spring 20 which will be pulled against the plate 11 when the plates have been separated a predetermined distance.

In the form shown in Figures 4 to 7 inclusive, I provide a stud 30 with a single slot 31. The shoulder 32 defines the detent 33. As shown in Figure 4 the plates 35 and 36 are held together by the fastener and a leaf spring member 37 is fastened to the plate 36. Leaf spring member 37 has an opening 38 at one end adapted to register with the stud and a tongue or projection 39 adapted to be engaged by the slot. As in the form shown in Figures 1 to 3 the shape of the spring 37 definitely limits the separation of the plates once the device is locked.

In the form shown in Figure 8 plates 60 and 61 are held together by the stud 62 and the leaf spring member 63, similar to the arrangement shown in Figures 1 to 3. However, in this type of construction, the head 64 of the stud is flush with the plate 60 and the plate accordingly is dimpled or bent inwardly at 65 to form a depression 66 in which the head 64 of the stud rests. Plate 61 is similarly dimpled at 67 to form a depression 68 and the spring 63 is dimpled at 69 in order that the parts may be properly fitted together.

In the form of receptacle shown in Figure 9, angular members 71 and 70 are provided for fastening the receptacle from two directions as, for instance, in the corner of the junction box. The cross bar 72 is provided for engagement with the stud in the usual manner.

It will be appreciated that with this construction, the point of tension, namely, the cross bar, may be supported from two directions.

I claim:

In a separable fastener of the type which includes a spiral cam stud and a receptacle which are interengageable upon the rotation of one with respect to another, an improved receptacle comprising an elongated spring metal strip having front and rear surfaces and formed with a flat attaching portion at one end with the remainder of the strip extending at a relatively small angle thereto in a rearward direction so that the opposite end of the strip is offset a short distance rearwardly with respect to the plane of the attaching portion, said opposite end being formed with an aperture large enough to accommodate the stud and having a locking bar for engaging the cam of the stud in association with said aperture and extending in a diametric direction.

WILLIAM DZUS.

REFERENCES CITED

The following references are of record in the file of this patent:

UNITED STATES PATENTS

| Number | Name | Date |
|---|---|---|
| 2,152,231 | Yaneson | Mar. 28, 1939 |
| 2,339,591 | Weber | Jan. 18, 1944 |
| 2,347,675 | Dzus | May 2, 1944 |
| 2,350,498 | Dick | June 6, 1944 |
| 2,421,204 | Jung | May 27, 1947 |